(12) United States Patent
Leung

(10) Patent No.: US 6,907,238 B2
(45) Date of Patent: Jun. 14, 2005

(54) BEACON FOR LOCATING AND TRACKING WIRELESS TERMINALS

(75) Inventor: Lauren Kwankit Leung, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 179 days.

(21) Appl. No.: 10/280,491

(22) Filed: Oct. 24, 2002

(65) Prior Publication Data

US 2004/0203566 A1 Oct. 14, 2004

Related U.S. Application Data

(60) Provisional application No. 60/407,579, filed on Aug. 30, 2002.

(51) Int. Cl.[7] .............................................. H04M 11/04
(52) U.S. Cl. .............................. 455/404.1; 455/404.2; 455/456.5; 455/456.1; 342/357.07; 342/357.09; 342/357.06; 340/988; 340/991; 340/993
(58) Field of Search .......................... 455/404.1, 404.2, 455/414.1, 456.5, 456.1, 466; 342/357.07, 357.09, 357.06, 375.1; 340/988, 991, 993, 285.4

(56) References Cited

U.S. PATENT DOCUMENTS 5,929,777 A * 7/1999 Reynolds ............... 340/825.49
6,314,281 B1 * 11/2001 Chao et al. .............. 455/404.2
6,362,778 B2 * 3/2002 Neher ................... 342/357.07
6,363,247 B1 * 3/2002 Gum ....................... 455/404.1
6,477,363 B1 * 11/2002 Ayoub et al. ............ 455/404.2
2001/0034223 A1 * 10/2001 Rieser et al. ............... 455/404
2001/0051514 A1 * 12/2001 Lindholm ................... 455/404
2002/0072378 A1 * 6/2002 Gaal .......................... 455/456

* cited by examiner

Primary Examiner—William Trost
Assistant Examiner—Danh C Le
(74) Attorney, Agent, or Firm—Philip Wadsworth; Bruce Greenhaus; Richard Bachand

(57) ABSTRACT

A method and apparatus to facilitate the locating and tracking of a wireless terminal, which may be advantageously used for E-911 service. The terminal may be directed to transmit a beacon for certain events, such as in connection with a 911 call. The beacon has a specific format known by the wireless network, and may be periodically or continuously transmitted. The beacon may be transmitted using various schemes. In a first scheme, the terminal transmits the beacon only when directed to do so by a designated network entity (e.g., the PSAP). In a second scheme, the terminal transmits the beacon in conjunction with the 911 call, and is thereafter directed to terminate the beacon transmission by the designated network entity. The beacon allows the terminal to be accurately located even if it has moved or is physically located in an enclosed or "not-so-obvious" location.

19 Claims, 6 Drawing Sheets

BEACON FOR LOCATING AND TRACKING WIRELESS TERMINALS

RELATED APPLICATIONS

This Application claims priority to U.S. Provisional Application Ser. No. 60/407,579, filed on Aug. 30, 2002.

BACKGROUND

1. Field

The present invention relates generally to communication, and more specifically to a method and apparatus that uses a beacon for locating and tracking a terminal in a wireless communication network.

2. Background

Wireless communication devices (or terminals) are widely used for various purposes. One key use of these terminals is for communication with a wireless communication network (e.g., a CDMA network) for voice, packet data, and so on. Another emerging use of these terminals is for position determination, which may be desirable or necessary in certain circumstances.

A common means by which to locate a terminal is to determine the amount of time required for signals transmitted from multiple sources at known locations to reach the terminal. One system that provides signals from a plurality of transmitters of known locations is the well-known Global Positioning System (GPS). Satellites in the GPS system are placed in precise orbits according to a GPS master plan. The locations of the GPS satellites can be identified by different sets of information (referred to as the Almanac and Ephemeris) transmitted by the satellites themselves. Another system that provides signals from transmitters (i.e., base stations) at known earth-bound locations is a wireless (cellular) communication network.

Signals from orbiting satellites and/or earth-bound base stations may be used to estimate the position of a terminal. By receiving and processing the signals transmitted from these transmitters, the amount of time required for the signals to travel from the transmitters to the terminal may be estimated and used to determine the distances (or ranges) between the transmitters and the terminal. The signals themselves may further include information indicative of the locations of the transmitters. By accurately determining the distances to three or more transmitters at known locations, the position of the terminal may be determined using trilateration, as is known in the art.

The Federal Communications Commission (FCC) has mandated that all wireless communication networks eventually support an enhanced emergency 911 (E-911) service. Under this mandate, the position of a wireless terminal in a 911 call is required to be sent to a Public Safety Answering Point (PSAP). The PSAP processes the 911 call and may dispatch rescue personnel to the terminal's location, if deemed necessary. However, the E-911 mandate imposes a relatively lax (i.e., non-stringent) requirement on the accuracy of the position estimate for the terminal. Thus, a position estimate that conforms to the E-911 requirement may be useful but still insufficient. For example, in a densely populated area, the position estimate may identify a particular building in which the terminal is located, but may not be able to identify a specific floor or unit where the terminal is located.

To satisfy the E-911 mandate, the terminal also needs to work in difficult environments (e.g., dense urban areas and indoor) and at low signal-to-noise-and-interference ratios (SNRs). These various factors may compromise the ability of the terminal to accurately estimate its position and/or to reliably transmit the position estimate to the base stations for reporting to the PSAP. If this occurs, then the likelihood of locating the terminal may be compromised, which may lead to undesirable or possibly even disastrous results.

There is therefore a need in the art for a method and apparatus to more reliably and accurately locate a wireless terminal, especially for E-911 application.

SUMMARY

A method and apparatus is provided herein to facilitate the locating and tracking of a wireless terminal. The method and apparatus may be advantageously used for E-911 service and possibly other applications. In an aspect, the terminal may be directed to transmit a beacon for certain events, such as in connection with a distress call or 911 call. The beacon has a specific format known by the wireless network, and may be periodically or continuously transmitted. The beacon allows the terminal to be accurately located even if it has moved or is physically located in an enclosed or "not-so-obvious" location (e.g., inside a building).

The beacon may be transmitted using various schemes. In a first scheme, the terminal transmits the beacon only when directed to do so by a designated network entity, which may be the PSAP. In a second scheme, the terminal transmits the beacon in conjunction with the 911 call, and is thereafter directed to terminate the beacon transmission by the designated network entity. Other schemes may also be used for the beacon transmission.

A method is provided herein for transmitting a beacon used to locate a terminal in a wireless communication network. In accordance with the method, a first command is initially received (e.g., from a caller) to initiate a call of a particular type (e.g., an emergency 911 call). This first command may be received via the terminal's keypads, or possibly using voice activation. Data for a position estimate for the terminal is then derived, e.g., by processing signals received from GPS satellites and/or base stations. Data for the call and data for the position estimate are then processed to provide a first modulated signal, which is then transmitted to the base stations in the wireless network.

Concurrently or thereafter, a second command is received to initiate the transmission of the beacon. For the first scheme, this second command may be received from the designated network entity (e.g., the PSAP). For the second scheme, the second command may be received within the terminal (e.g., from a controller). In either case, upon receiving the second command, data for the beacon is processed to provide a second modulated signal having included therein the beacon. The second modulated signal is then transmitted by the terminal.

For the first scheme, the designated network entity may thereafter send a third command to direct the terminal to stop the beacon transmission. In this case, the terminal terminates the beacon transmission upon receiving the third command.

The data for the beacon may be data of a particular data pattern, and the processing may include covering the beacon data with a particular "channelization" code (described below). The data pattern, the channelization code, and the power level for the beacon, or any combination thereof, may be specified, e.g., by the designated network entity via the second command.

Various aspects and embodiments of the invention are described in further detail below. The invention further provides methods, transmitter units, terminals, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
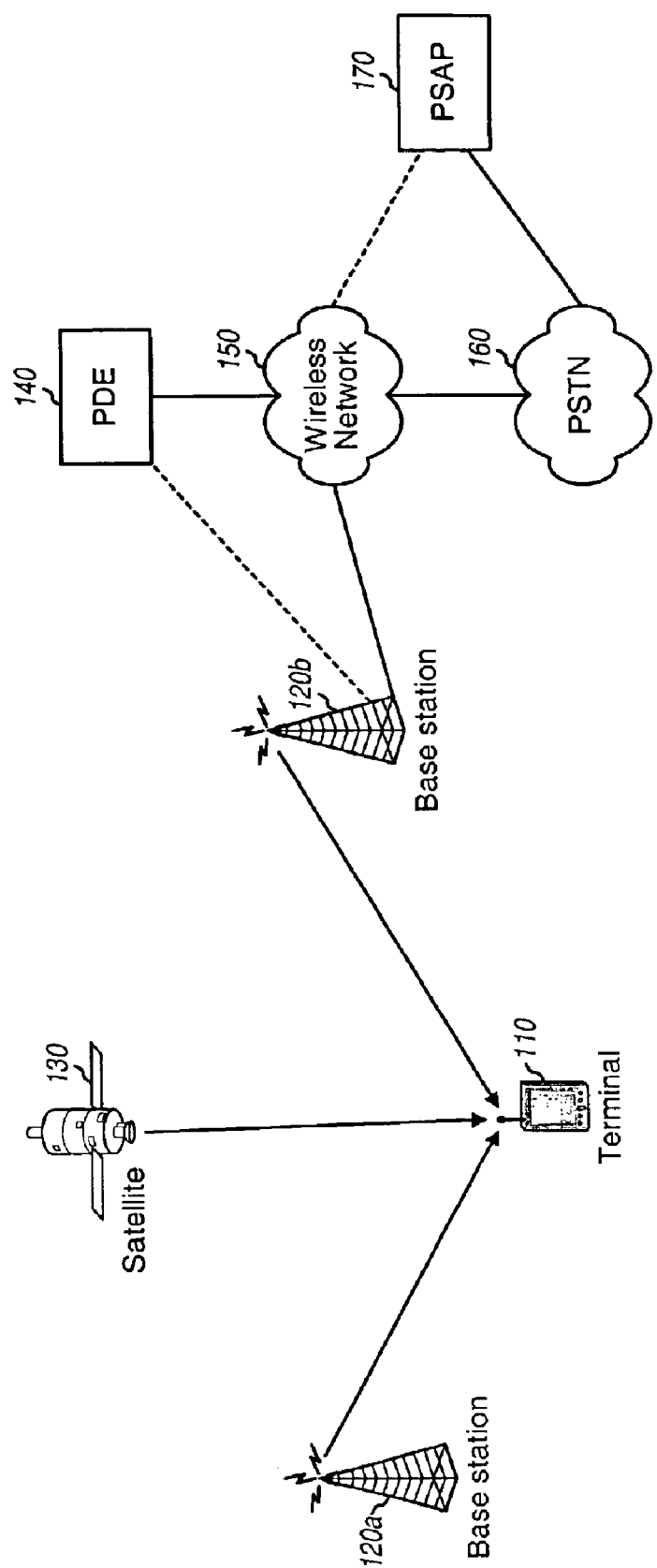
FIG. 1 is a diagram of a system wherein various aspects and embodiments of the invention may be implemented.

FIG. 1 is a diagram of a system wherein various aspects and embodiments of the invention may be implemented. A terminal 110 whose position is to be ascertained may communicate with one or more base stations 120. These base stations may be part of a wireless communication network 150 that supports communication for a number of wireless terminals (only one terminal is shown in FIG. 1 for simplicity). Wireless network 150 may further couple to a public switched telephone network (PSTN) 160 that supports communication with conventional (wireline) telephones. Base stations 120, wireless network 150, and PSTN 160 may collectively support various types of communication services for terminal 10, such as voice, packet data, and so on.

Terminal 110 may also be designed with the capability to determine and report its position, or to ascertain and provide information needed by another network entity to determine the terminal's position. To determine its position, terminal 110 receives signals transmitted from a number of transmitters, which may be base stations 120 of wireless network 150 and/or satellites 130 of the Global Positioning System (GPS). In general, any type of transmitters having locations that are known or can be ascertained may be used to determine the position of the terminal.

Terminal 110 may be any device capable of receiving and processing one or wore signals transmitted from base stations 120 and/or satellites 130. In one embodiment, terminal 110 is a cellular telephone capable of receiving signals from a number of transmitters. In other embodiments, terminal 110 way be an electronics unit (e.g., a computer terminal, a personal digital assistant (PDA), and so on) having a wireless modem, a stand-alone GPS receiver, a receiver capable of receiving signals from satellites and/or base stations, or any other type of receiver.

The position of terminal 110 may be estimated based on signals received at the terminal (e.g., such as those transmitted from the GPS satellites and/or base stations) plus the locations of the transmitters from which the signals originated. The position of the terminal may be estimated by the terminal, a Position Determining Equipment (PDE) 140 in the wireless communication network, a base station, or some other network entity. The entity performing the position estimation is provided with the necessary information (e.g., the pertinent time or pseudo-range measurements, and either the locations of the transmitters or the means to determine these locations). Techniques for determining the position of a terminal based on signals received from satellites and/or base stations are known in the art and not described in detail herein.

As noted above, the FCC has mandated that all wireless communication networks eventually support an enhanced emergency 911 (E-911) service. In accordance with this mandate, whenever a caller makes a distress call to 911 with a wireless terminal, the location of the terminal is required to be sent to a Public Safety Answering Point (PSAP), which may be a 911 center. This may be achieved by having the terminal estimate its position and transmit the position estimate to one or more base stations. Alternatively, the terminal may transmit information necessary to estimate, and the PDE may then estimate the position of the terminal. In either case, the position estimate for the terminal is routed through wireless network 150 and/or PSTN 160 to PSAP 170. PSAP 170 may then respond to the distress call by dispatching rescue personnel to the terminal location.

To satisfy the requirements mandated by the FCC for E-911 service, the terminal needs to work in difficult environments (e.g., dense urban areas and indoor) and at low signal-to-noise-and-interference ratios (SNRs). These various factors may compromise the ability of the terminal to accurately estimate its position and/or to reliably transmit the position estimate to the base stations for reporting to the PSAP. Moreover, the E-911 mandate imposes a relatively lax (i.e., non-stringent) requirement on the accuracy of the position estimate for the terminal. Thus, a position estimate that conforms to the E-911 requirement may be useful but still insufficient. For example, in a densely populated area, the position estimate may identify a particular building in which the terminal is located, but may not be able to identify a specific floor or unit where the terminal is located (which may be ascertainable from a 911 call on a wireless telephone). Higher accuracy than that imposed by the E-911 mandate may be desirable in certain situations.

A method and apparatus is provided herein to facilitate the locating and tracking of a wireless terminal. The method and apparatus may be advantageously used for E-911 service and possibly other applications. In an aspect, the terminal may be directed to transmit a beacon (or may initiate the transmission of the beacon) for certain events, such as in connection with a 911 call. The beacon has a specific format known by the wireless network, and may be periodically or continuously transmitted. The beacon allows the terminal to be accurately located even if it has moved or is physically located in an enclosed or "not-so-obvious" location. The beacon and its use are described in further detail below.

Figure 2:
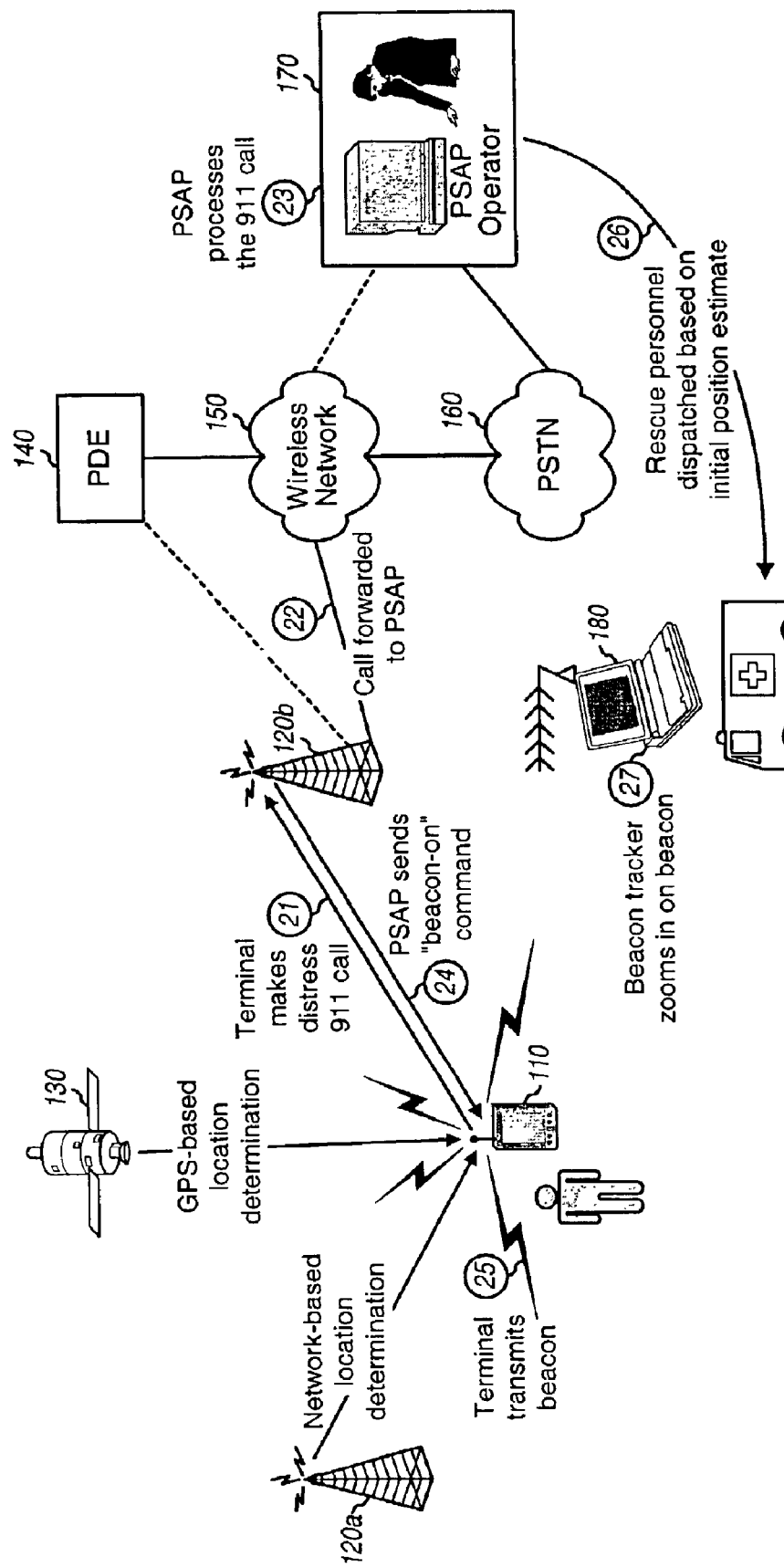
FIGS. 2 and 3 are diagrams that graphically illustrate the first and second schemes, respectively, for using a beacon to locate and track a wireless terminal.

FIG. 2 is a diagram that graphically illustrates a first scheme for using a beacon to locate and track a wireless terminal. In this scheme, the terminal transmits the beacon when directed by an appropriate network entity (e.g., the PSAP). In this way, the network entity can enable the beacon transmission under appropriate circumstances and can further control the beacon transmission, as described below.

Initially, a caller makes a distress 911 call using the terminal, which may be, for example, a cellular phone (step 21). As part of the 911 call, the terminal may provide an estimate of its position or the information needed to estimate the terminal's position. The 911 call is routed through the wireless network and/or PSTN to the PSAP (step 22). The PSAP receives and processes the 911 call and determines the needed rescue personnel (e.g., police, fire, ambulance, and so on), if any (step 23). To comply with the FCC's E-911 mandate, the PSAP may also be provided with an estimate of the position of the terminal. The PSAP can then relay this information to the rescue personnel.

In the first scheme shown in FIG. 2, the PSAP may also send a "beacon-on" command to the terminal to direct it to start transmitting a beacon (step 24). The terminal may be commanded to transmit the beacon under certain appropriate circumstances, e.g., as determined by the PSAP. For example, the beacon may be enabled if it is determined that the caller (1) is the one in need of help or (2) will be staying with the one in need of help. The beacon may not be enabled by the PSAP if the location of the caller is not required or if turning on the beacon would result in erroneous or redundant information (e.g., if the caller will not be at the location where help is needed).

The beacon-on command is routed through the wireless network and/or PSTN and transmitted by the base stations to the terminal. In response to receiving the beacon-on command, the terminal starts transmitting the beacon (step 25).

The rescue personnel may be dispatched to the terminal's location based on the initial position estimate provided to the PSAP with the 911 call (step 26). Upon approaching the terminal's location, a "beacon tracker" 180 may be used to determine a more exact location of the terminal (step 27). The beacon tracker may be able to "zoom in" on the caller, even if the caller has moved since the time the 911 call was made and/or is physically located in an enclosed or not-so-obvious location (e.g., inside a building).

The first scheme shown in FIG. 2 allows a designated network entity to control various operations of the beacon. This designated network entity may be the PSAP or some other network entity. For simplicity, much of the following description assumes that the designated network entity is the PSAP. Some of the features and characteristics of the beacon that may be controlled by the PSAP are described below.

First, the PSAP can enable or not enable the beacon based on the received call and the information received from the call. The beacon may not be enabled if the position of the caller needs not be ascertained. This may be the case, for example, if the caller is passing through an accident scene or if the 911 call is a false alarm. Also, the PSAP may receive many 911 calls for a given accident, and it may not be desirable or necessary to locate and track each caller since that may be unnecessary or redundant. If there are many callers for a given event, then the PSAP may select a specific number of terminals to locate and track, and would then enable the beacon transmission from only the selected terminals.

Second, the PSAP may be able to determine the manner in which the beacon is generated and transmitted. For example, the PSAP may (1) determine the processing to be performed to generate the beacon, (2) select a particular transmission scheme to use for the beacon, (3) determine the amount of transmit power to use for the beacon, and so on. The generation and transmission of the beacon are described in further detail below.

Figure 3:
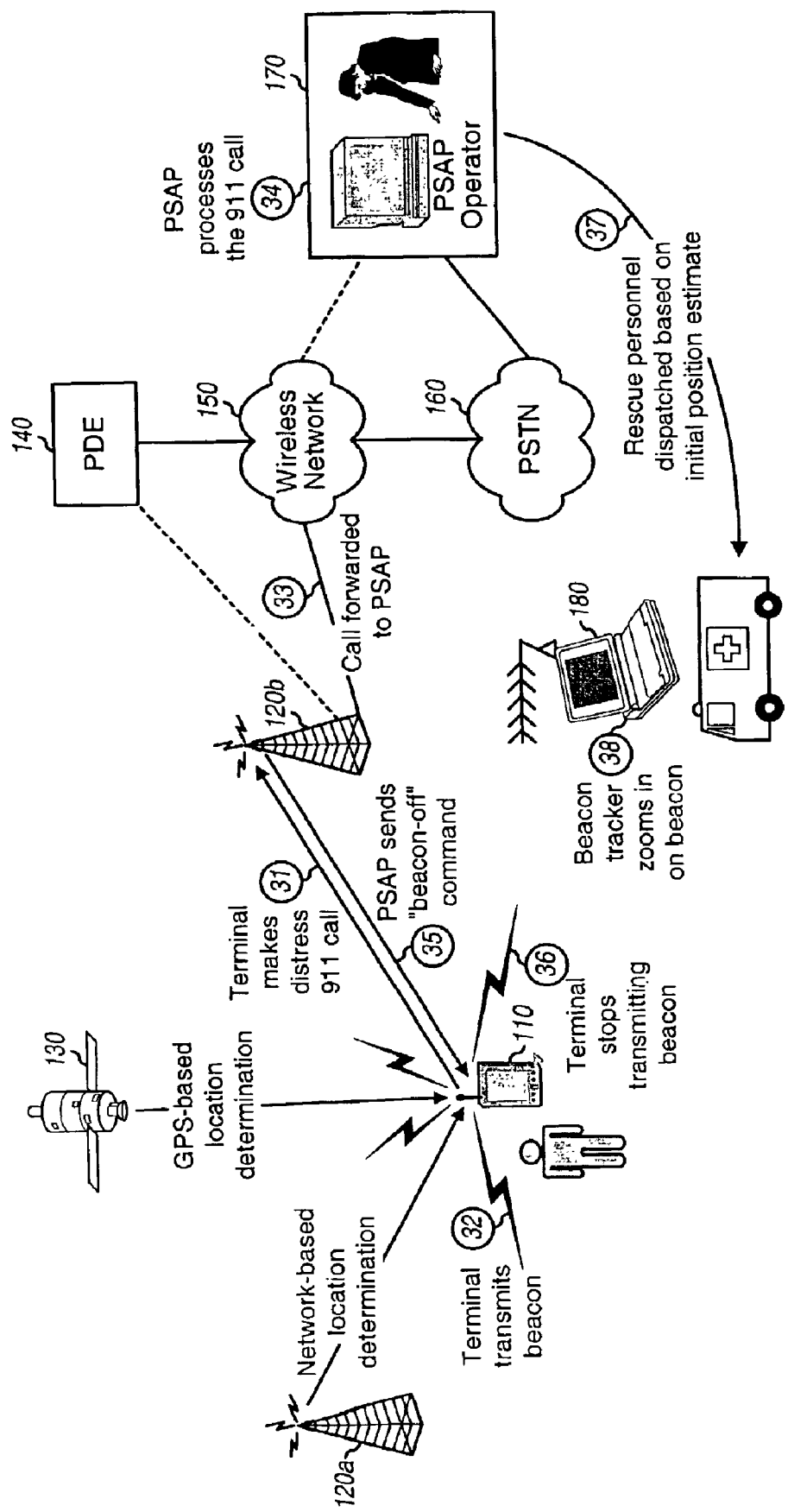

FIG. 3 is a diagram that graphically illustrates a second scheme for using a beacon to locate and track a wireless terminal. In this scheme, the terminal transmits the beacon in conjunction with certain types of calls, such as a 911 call. The beacon may thereafter be disabled if directed by a designated network entity (e.g., the PSAP). This scheme ensures that the beacon will be turned on by the terminal under certain circumstances where the beacon may be needed (without the need to receive the beacon-on command from the designated network entity). This scheme may be advantageously used in certain operating environments where the beacon-on command cannot be assured to be reliably received by the terminal.

Initially, a caller makes a distress 911 call using the terminal (step 31). As part of the 911 call, the terminal may provide an estimate of its position or the information needed to estimate its position. For this scheme, in conjunction with the 911 call, the terminal starts transmitting the beacon (step 32). The 911 call is routed through the wireless network and/or PSTN to the PSAP (step 33). The PSAP receives and processes the 911 call, determines the needed rescue personnel, and relays the terminal's position estimate to the rescue personnel (step 34).

For the second scheme shown in FIG. 3, the terminal continues to transmit the beacon until it receives a command from the designated network entity to turn off the beacon, which may be the case if it is determined that the location of the caller is not needed. The PSAP may thus send a "beacon-off" command to the terminal to direct it to stop transmitting the beacon (step 35). The beacon-off command is routed through the wireless network and/or PSTN and transmitted by the base stations to the terminal. In response to receiving the beacon-off command, the terminal stops transmitting the beacon (step 36).

Again, the rescue personnel may be dispatched to the terminal's location based on the initial position estimate provided to the PSAP with the 911 call (step 37). Upon approaching the terminal's location, the beacon tracker may be used to determine a more exact location of the terminal (step 38).

In another scheme, the terminal (e.g., a data-only or automated device) is able to initiate a distress call to the PSAP and start its own beacon transmission. Alternatively, the terminal can call a service provider to indicate distress. The service provider can then contact the PSAP about the incident, and the PSAP can initiate the beacon transmission of the terminal.

As an example, a terminal may be mounted on an asset (e.g., a piece of goods in a warehouse, a car in a dealer's lot, and so on), or a person (e.g., a small child or a senior person). The terminal continuously communicates with a designated base station in its perimeter, which may be limited to a particular distance. If the terminal loses communication with this base station, then it initiates a call to a service provider. The loss of communication can imply that the terminal has moved out of the area where it is supposed to be (e.g., if the piece of asset is stolen or the person is lost). Upon receiving the call from the terminal, the service provider can inform the PSAP and/or law enforcement. The terminal can start the beacon transmission on its own or upon receiving a command to do so from the service provider or PSAP. Law enforcement can then try to track the terminal based on its last known location and the beacon transmission.

Other schemes may also be devised for using the beacon to locate and track a wireless terminal. These other schemes are also within the scope of the invention.

Figure 4:
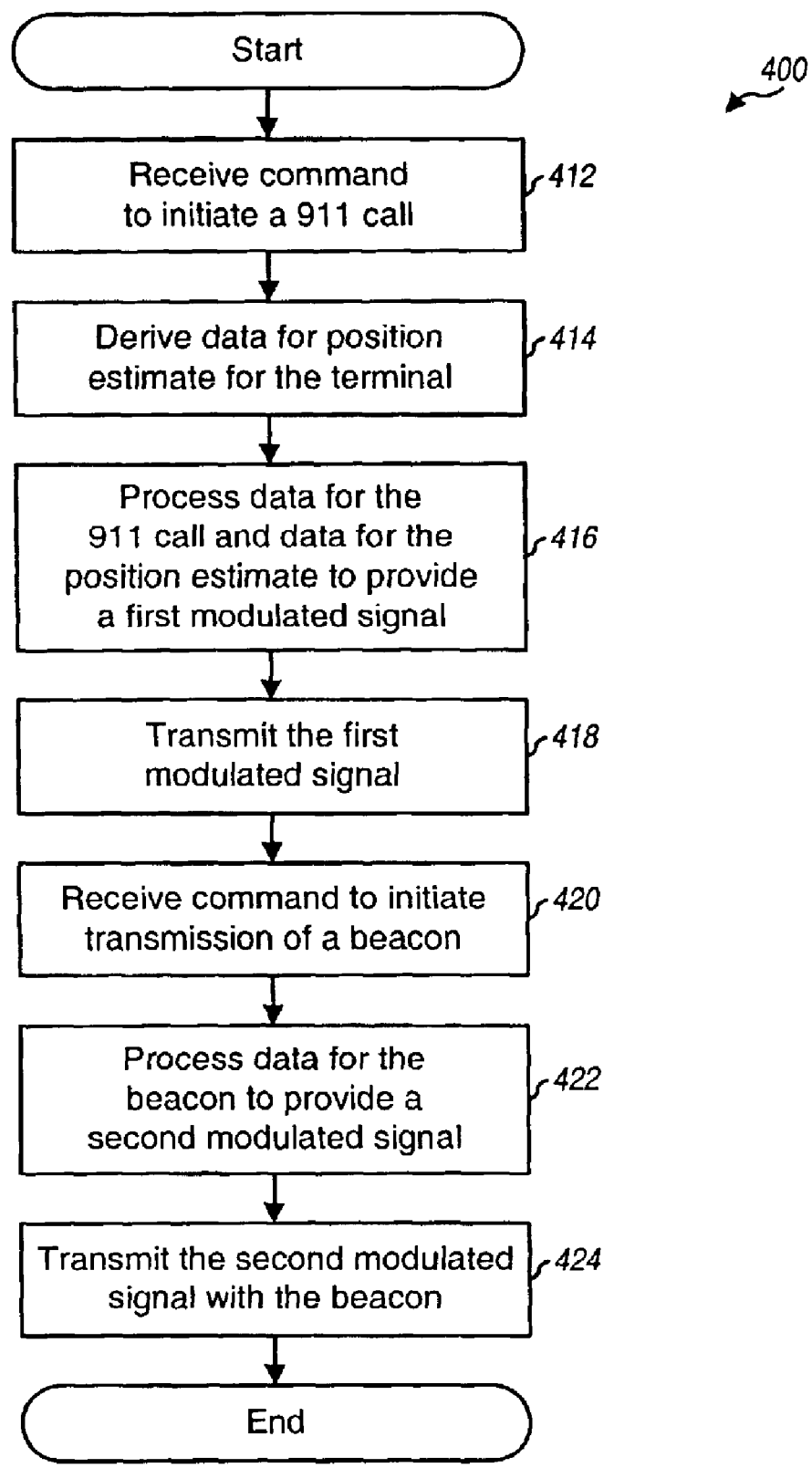
FIG. 4 is a flow diagram of an embodiment of a process for transmitting a beacon used to locate and track a wireless terminal.

FIG. 4 is a flow diagram of an embodiment of a process 400 for transmitting a beacon used to locate and track a wireless terminal. Process 400 may be performed by the terminal.

Initially, a first command is received to initiate a call of a particular type (e.g., an emergency 911 call) (step 412). This first command may be received from the caller (e.g., via the terminal's keypads, or possibly using voice activation). In response to receiving this command, signals from a number of transmitters (e.g., GPS satellites and/or base stations) may be processed by the terminal to provide data for a position estimate for the terminal (step 414). This data may be indicative of the position estimate for the terminal, or may be data for (e.g., pseudo-range) measurements that may be used to determine the position of the terminal. The data for the call and the data for the position estimate are then processed to provide a first modulated signal (step 416), which is then transmitted to the wireless network (step 418).

The transmitted signal is received by the wireless network, and the 911 call is routed to the PSAP for processing. Based on the nature and severity of the call, rescue personnel may be dispatched to the caller.

Concurrently or thereafter, a second command is received to initiate transmission of the beacon (step 420). For the first scheme described above, this second command may be received from the designated network entity (e.g., the PSAP). And for the second scheme described above, the second command may be received within the terminal (e.g., from a controller). In either case, upon receiving the second command, data for the beacon is processed to provide a second modulated signal having included therein the beacon (step 422). The data for the beacon may be data of a particular data pattern, and the processing may include covering the beacon data with a particular "channelization" code (described below). The data pattern, the channelization code, and the power level for the beacon, or any combination thereof, may be specified a priori or by the second command. The second modulated signal with the beacon is then transmitted by the terminal (step 424).

For the first scheme, the PSAP may send the second (beacon-on) command to direct the terminal to start transmitting the beacon. For the second scheme, a third (beacon-off) command may be received from the PSAP to direct the terminal to stop the transmission of the beacon. In this case, the terminal terminates the beacon transmission upon receiving the third command (which is not shown in FIG. 4 for simplicity).

The beacon may be used to facilitate the locating and tracking of a terminal even in difficult environments. The beacon may be implemented with various features that improve its effectiveness. Some of these features are described below.

The beacon may be generated in a manner such that it is distinguishable from all other transmissions from the terminals. In an embodiment, the beacon is generated based on a known data pattern and using a known processing scheme. For example, the beacon may be generated based on a sequence of all zeros, a sequence of alternating zeros and ones, and so on. Different data patterns may be used for the beacons from different terminals. Moreover, the specific data pattern to be used by any given terminal may be provided by the PSAP or the wireless network.

For a CDMA wireless network, the beacon may be transmitted on a particular code channel by covering the beacon data with a particular channelization code. The CDMA network supports data transmission on a number of code channels, and these code channels are distinguished from one another by the use of different channelization codes. Depending on the particular CDMA standard being implemented, the channelization code may be a Walsh code (for IS-95 and cdma2000), an orthogonal variable spreading factor (OVSF) code (for W-CDMA), or some other orthogonal or pseudo-orthogonal code used to channelize data onto the proper code channels. For simplicity, the channelization code is assumed to be a Walsh code.

In one embodiment, a set of one or more Walsh codes may be reserved and used exclusively for beacon transmission. In another embodiment, any available Walsh code (i.e., a Walsh code that is not currently in use) may be used for beacon transmission. In either case, the specific Walsh code to use for beacon transmission may be determined by the designated network entity and provided to the terminal.

The beacons from multiple terminals may be distinguished from one another by various means. In one embodiment, distinguishable beacons may be generated by using different data patterns in conjunction with a common Walsh code. In another embodiment, the beacons from multiple terminals may be distinguished by using the same data pattern in conjunction with different Walsh codes. The specific data pattern and/or Walsh code to be used by any given terminal for the beacon may be determined by a network entity (e.g., by the PSAP or an entity in the wireless network) and provided to the terminal. This design may provide the most flexibility in the generation of the beacon.

In certain embodiments, the beacon may further be spread with a specific spreading code assigned to the terminal. This spreading code may be a long pseudo-random noise (PN) sequence (for IS-95 and cdma2000) or a scrambling code (for W-CDMA).

In general, the beacon may be generated in any manner that allows the wireless network to distinguish the beacon from all other reverse link transmissions from the terminals. Moreover, the beacon is generated in a manner consistent with the processing defined by the specific standards (e.g., IS-95, cdma2000, W-CDMA, and so on) being implemented by the wireless network.

The beacon may be transmitted using various schemes. In one transmission scheme, the beacon is transmitted continuously at all times until disabled. This scheme may allow the beacon to be more easily detected. In another transmission scheme, the beacon is transmitted periodically at known intervals until disabled. For example, the beacon may be transmitted for one (20 msec) frame out of every 50 frames. This scheme may be used to conserve terminal battery and reduce the amount of interference generated by the beacon while still maintaining its effectiveness. The On and Off durations for the periodic transmission may be selected to provide reliable detection of the beacon under the expected worst case operating environments. In yet another transmission scheme, the beacon is transmitted in a manner defined by the designated network entity. For example, the terminal may be directed to transmit the beacon continuously for a period of time, then periodically until turned off. Numerous other transmission schemes may also be used for the beacon, and this is within the scope of the invention.

The beacon may also be transmitted at a particular power level determined to provide reliable detection of the beacon. In a first embodiment, the beacon is transmitted at an initial power level that may be estimated in a particular manner. For example, the initial power level may be estimated based on the SNR of a pilot transmitted on the forward link and received at the terminal. In a second embodiment, the beacon is initially transmitted at a low power level and gradually adjusted upward (e.g., by the designated network entity). This embodiment may reduce the amount of power consumption and interference due to the beacon. In a third embodiment, the beacon is initially transmitted at a higher power level and may thereafter be adjusted downward. This embodiment may increase the likelihood of beacon detection at a cost of higher power usage and higher level of interference. In a fourth embodiment, the beacon is initially transmitted at the highest power level possible and may thereafter be adjusted downward. In a fifth embodiment, the beacon is transmitted at a specific power level determined by the designated network entity.

Power control may also be used to adjust the transmit power of the beacon so that reliable detection may be achieved while minimizing the amount of interference to other transmissions on the wireless link. The power control for the beacon may be implemented in similar manner as that for the reverse link traffic channel, which is known in the art. In one beacon power control implementation, if any base station receives the beacon at an SNR that is higher than a particular threshold SNR, then the transmit power for the beacon may be adjusted lower. If the base station can receive the beacon at a high SNR, then the beacon tracker will most likely be able to detect the beacon.

The particular transmission scheme and power level to use for the beacon may also be selected based on circumstances surrounding the event that give rise to the 911 call. For example, the continuous transmission scheme and a high power level may be used for an urgent event, as determined by the PSAP operator (e.g., a heart attack victim inside a building). The periodic transmission scheme and a lower power level may be used for less pressing event (e.g., a driver who is out of gas).

In accordance with the E-911 mandate, the position of the terminal is estimated and provided to the PSAP as part of the 911 call. This initial position estimate may or may not be very accurate, depending on the terminal's whereabouts and the operating conditions when the estimate was made. In an embodiment, after the 911 call is made and until directed otherwise, the terminal can maintain communication with the wireless network, periodically estimates its position, and reports updated position estimates to the wireless network. The updated position estimates may then be used to direct rescue personnel to the caller's location.

Conventionally, the position of the terminal may be estimated based on the signals transmitted from orbiting GPS satellites and/or earth-bound base stations. In certain operating environments, a position estimate cannot be derived from the signals from the satellites and/or base stations due to various reasons such as (1) the satellites are not in view, (2) the forward link signals from the base stations are weak, and so on.

The beacon transmitted by the terminal may also be used by the wireless network to determine the position of the terminal. In particular, the beacon transmitted by the terminals may be received by multiple base stations and used to derive pseudo-ranges from the terminal to these base stations. These pseudo-range measurements may then be used to estimate the terminal's position, in similar manner as the use of pseudo-range measurements from base stations and/or satellites to estimate the terminal's position. The position estimate derived from the beacon may be less accurate due to various factors (e.g., multipath in the terrestrial propagation environment), but may be valuable nevertheless. The position estimate derived from the beacon may be used to approximately locate the terminal (e.g., so that rescue personnel may be sent to this location). A more exact location of the terminal may be determined subsequently, for example, with the use of the beacon tracker. Position determination based on reverse link signals is known in the art and not described herein.

In another aspect, the terminal may be designed with the capability to send predefined transmissions based on specific user commands. In one embodiment, a "panic" button may be defined which, if activated, causes the transmission of certain information and the beacon. The panic button may be a specifically defined button on the terminal, or a sequence of keystrokes (e.g., "9-1-1-9-1-1"). The information to be transmitted by the terminal in response to activation of the panic button may be any information deemed useful such as, for example, the terminal's identification, an estimate of the terminal's position, information about the caller, information related to the event, and so on, or any combination thereof. The terminal may further transmit the beacon to allow rescue personnel to locate the terminal, and this beacon may be generated and transmitted in the manner described above. Different "special" buttons or different sequences of keystrokes may be used for different types of events.

Figure 5:
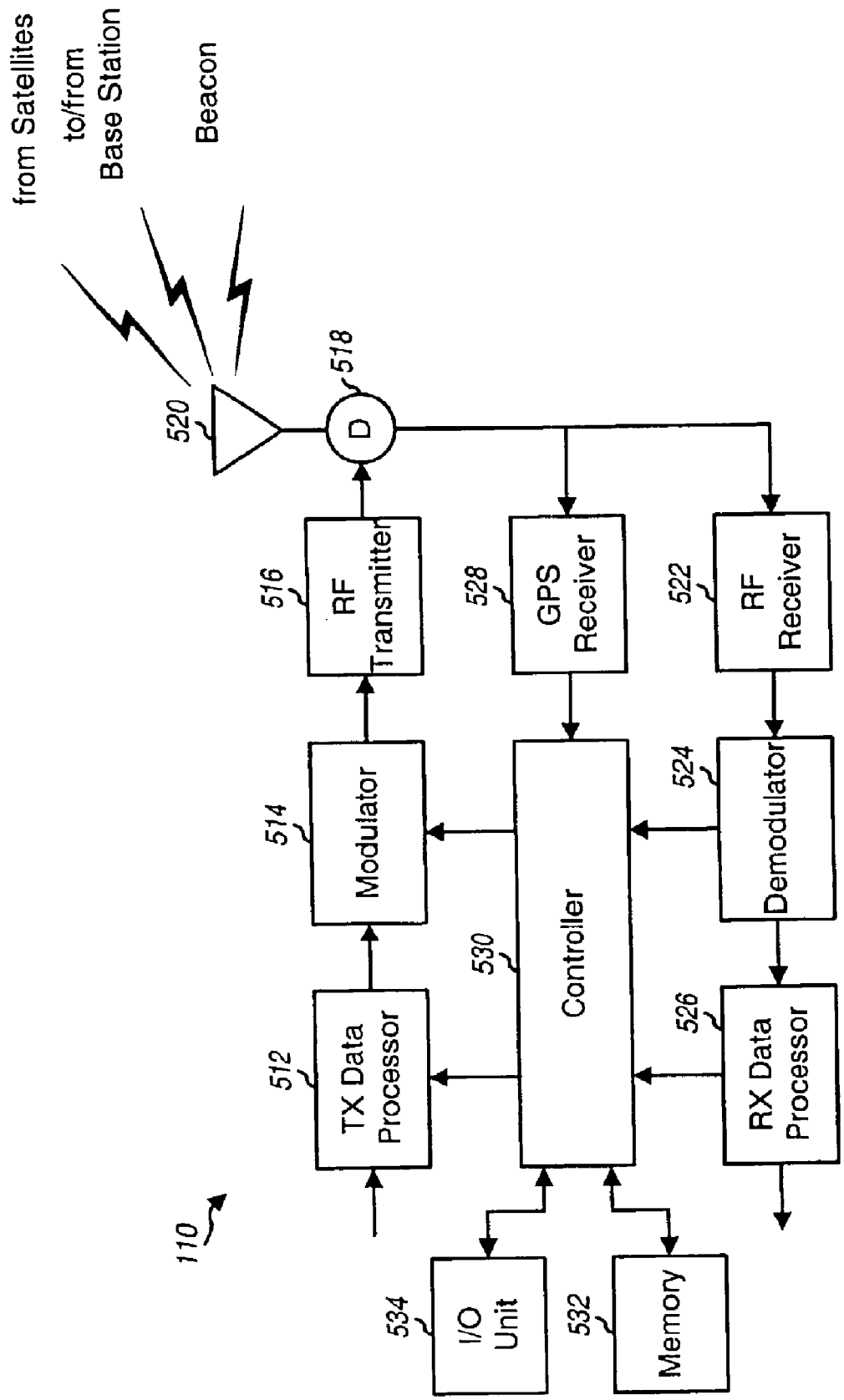
FIG. 5 is a block diagram of a wireless terminal.

FIG. 5 is a block diagram of wireless terminal 110, which is capable of transmitting a beacon and implementing various aspects and embodiments of the invention.

On the reverse link, various types of data (e.g., data for a 911 call, the position estimate, the beacon, and so on) are received and processed (e.g., formatted and encoded) by a transmit (TX) data processor 512. The processed data is further modulated (e.g., covered and spread) by a modulator 514. Different processing may be performed by TX data processor 512 and modulator 514 for different types of data. For example, the beacon data may be covered by modulator 514 but not coded by TX data processor 512. A controller 530 may direct the operation of TX data processor 512 and modulator 514.

The modulated data is then conditioned (e.g., converted to one or more analog signals, amplified, filtered, upconverted, and so on) by an RF transmitter 516 to generate a reverse-link modulated signal. This modulated signal may include the 911 call, the beacon, the position estimate, some other information, or any combination thereof. The reverse-link modulated signal is then routed through a duplexer 518 and transmitted via an antenna 520 to the base stations.

On the forward link, signals from the base stations and/or GPS satellites are received by antenna 520, routed through duplexer 518, and provided to an RF receiver 522 and possibly a GPS receiver 528. RF receiver 522 conditions (e.g., filters, amplifies, and downconverts) the received signal and further digitizes the conditioned signal to provide data samples.

To recover a forward-link data transmission from a base station, a demodulator 524 receives and processes (e.g., despreads, decovers, and pilot demodulates) the data samples in a manner known in the art to provide recovered symbols. Demodulator 524 may implement a rake receiver that can (1) concurrently process multiple signal instances (or multipath components) in the received signal and (2) combine recovered symbols for a number of multipaths. A receive (RX) data processor 526 then decodes the recovered symbols, checks the received frames, and provides the output data. The processing performed by demodulator 524 and RX data processor 526 is complementary to that performed at the base station.

For position determination, RF receiver 522 or demodulator 524 may provide to controller 530 the arrival time measurements for the strongest received multipath components or the multipath components having signal strengths that exceed a particular threshold level. A GPS receiver 528 receives and searches for GPS signals, and may similarly provide to controller 530 the arrival time measurements for the GPS satellites found by GPS receiver 528. For some embodiments, terminal 110 does not include GPS receiver 528.

For the beacon transmission, demodulator 524 or RX data processor 526 may recover and provide to controller 530 a beacon-on or beacon-off command from the PSAP to respectively start or stop the beacon transmission.

Controller 530 provides various controls and performs various processing for terminal 110. For position determination, controller 530 receives the time measurements for the base stations and/or GPS satellites. Controller 530 may then derive pseudo-range measurements based on the time measurements, and may further estimate the terminal's position based on the pseudo-range measurements in a manner known in the art. As necessary or when directed, the time or pseudo-range measurements and/or the position estimate may be provided to TX data processor 512 and processed for transmission back to the base stations.

Controller 530 may further provide controls to direct various units within terminal 110 to perform the proper signal processing. For example, controller 530 may provide the required controls to direct TX data processor 512 to send a 911 call to the base stations. Controller 530 may further provide the controls to direct TX data processor 512 and/or a modulator 514 to generate and transmit the beacon.

A memory 532 couples to controller 530 and may be used to store data and program codes for the controller. An input/output (I/O) unit 534 may interface to a keyboard, a display, and/or other I/O elements of the terminal. I/O unit 534 may be used to receive user inputs for a 911 call, a panic button activation, and so on. The user inputs are then provided by I/O unit 534 to controller 530 for processing.

As noted above, a beacon tracker may be used to locate and track a wireless terminal based on its beacon. The beacon tracker may include a directional antenna capable of detecting the beacon using a directional antenna beam. Based on the received signal strength of the beacon, the tracker may be able to zoom in on the terminal's location. The beacon tracker may be implemented based on various designs. One specific design is described below.

Figure 6:
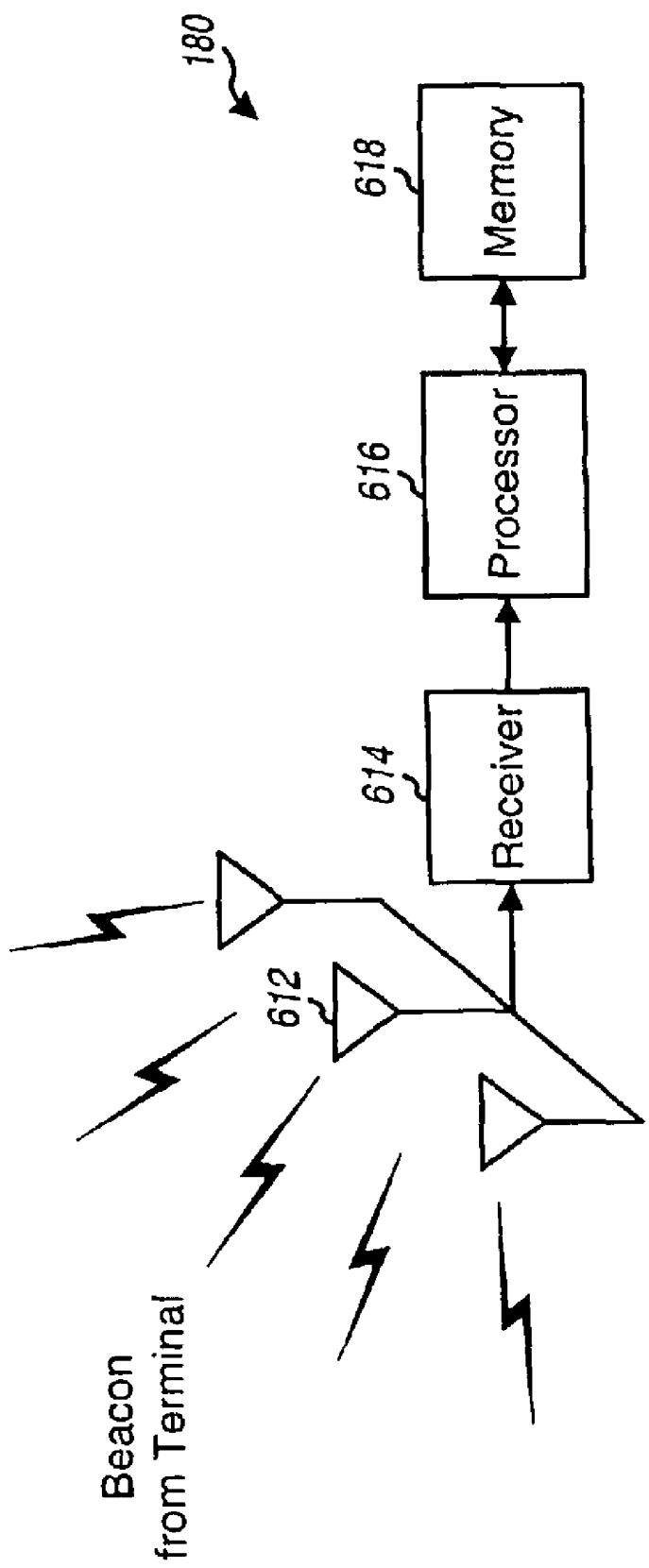
FIG. 6 is a block diagram of an embodiment of a beacon tracker.

FIG. 6 is a block diagram of an embodiment of beacon tracker 180. In this embodiment, beacon tracker 180 includes an antenna array 612, a receiver 614, a processor 616, and a memory 618. Antenna array 612 may be implemented with multiple antenna elements, a multiple antenna array, or based on some other antenna design. Antenna array 612 is able to detect signals based on a directional beam. Antenna array 612 receives various RF signals that may include a beacon from a terminal, and provides the received signals to receiver 614 for processing.

Receiver 614 includes various circuitry (e.g., RF processing circuitry and/or other receiver circuitry) necessary to process the received signals to determine the direction and signal strength of the beacon. Receiver 614 conditions (e.g., filters, amplifies, and downconverts) each received signal and further digitizes each conditioned signal to provide a corresponding stream of data samples. Receiver 614 may further despread and decover each data sample stream in a manner complementary to the spreading and covering performed at the terminal. Receiver 614 may further correlates the decovered data with the same data pattern used by the terminal to generate the beacon. The result of the correlation processing is an indication of the signal strength of the received beacon. Receiver 614 then provides the results of the correlation to processor 616.

In an embodiment, receiver 614 may be implemented in similar manner as a channel element in a base station, which is used to process a reverse-link modulated signal from one terminal. However, since only reduced functionality is required for receiver 614 (i.e., the processing of a beacon), the design for receiver 614 may be simplified.

Processor 616 may direct various operations of receiver 614. For example, the specific Walsh code and data pattern to use to detect the beacon may be provided by the PSAP to processor 616, which then directs receiver 614 to use this Walsh code and data pattern. A memory 618 couples to processor 616 and provides storage for data and program codes for the processor.

The designs of other network entities (e.g., base station 120, PDE 140, PSAP 170, and so on) are known in the art and not described herein.

The beacon transmission described herein may be used in various wireless communication networks. These networks may be multiple-access communication networks capable of supporting communication with a number of users, and may be based on code division multiple access (CDMA), time division multiple access (TDMA), frequency division multiple access (FDMA), or some other multiple access techniques. CDMA networks may provide certain advantages over other types of network, including increased capacity. Each network may implement one or more standards specific to the network type. For example, a CDMA network may be designed to implement IS-95, cdma2000, W-CDMA, and/or some other standard or design. A TDMA network may be designed to implement GSM or some other standard or design. These various standards are well known in the art.

The beacon generation, transmission, and tracking described herein may be implemented by various means. For example, the elements used to generate and transmit the beacon at the terminal may be implemented in hardware, software, or a combination thereof. For a hardware implementation, the elements used to generate and transmit the beacon may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some of the processing to generate the beacon may be implemented with modules (e.g., procedures, functions, and so on) that perform the functions described herein. The software codes may be stored in a memory unit (e.g., memory 532 in FIG. 5) and executed by a processor (e.g., controller 530). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for enabling terminal to be located in a wireless communication network, comprising:

initiating a call from said terminal in response to a first command on a forward communication link;

generating position data from which a position estimate for the terminal can be determined;

processing data for the call and said position data to provide a first modulated signal;

transmitting the first modulated signal on a reverse communication link;

receiving a second command to initiate transmission of a beacon;

in response to said second commend, providing a second modulated signal having included therein the beacon in combination with other signals, said beacon having characteristics that can be used to locate the terminal; and transmitting the second modulated signal on said reverse communication link.

2. The method of claim 1, wherein the call is an emergency 911 call.

3. The method of claim 1, wherein the second command is received via the wireless communication network.

4. The method of claim 1, wherein the second command is received from a Public Safety Answering Point (PSAP).

5. The method of claim 1, wherein the second command is generated by the terminal, the method further comprising:

receiving a third command to stop transmitting the beacon; and terminating the transmission of the beacon in response to receiving the third command.

6. The method of claim 1, wherein the beacon is transmitted continuously.

7. The method of claim 1, wherein the beacon is transmitted periodically.

8. The method of claim 1, wherein the beacon is transmitted based on one of a plurality of possible transmission schemes.

9. The method of claim 1, further comprising:

receiving a plurality of signals from a plurality of transmitters; and processing the plurality of signals to provide the data for the position estimate.

10. The method of claim 9, wherein the plurality of transmitters include at least one GPS satellite.

11. The method of claim 1, wherein the beacon includes a particular data pattern with a particular channelization code.

12. The method of claim 11, wherein the particular channelization code is a Walsh code reserved for use for beacon transmission in the wireless communication network.

13. The method of claim 11, wherein the particular data pattern is specified by the second command.

14. The method of claim 1, wherein the second modulated signal is transmitted at a particular power level.

15. The method of claim 14, wherein the particular power level is specified by the second command.

16. An apparatus in a wireless communication network, comprising:

means for receiving a first command to initiate a call of a particular type;

means for providing data for a position estimate for the terminal;

means for processing data for the call and data for the position estimate to provide a first modulated signal;

means for transmitting the first modulated signal;

means for receiving a second command to initiate transmission of a beacon;

means for processing data for the beacon to provide a second modulated signal having included therein the beacon; and means for transmitting the second modulated signal in combination with the first modulated signal on a reverse communication link in the wireless communications network.

17. The apparatus of claim 16, wherein the means for processing the data for the beacon includes means for covering data of a particular data pattern with a particular Walsh code.

18. The apparatus of claim 17, wherein the particular data pattern and the particular Walsh code are specified by the second command.

19. The apparatus of claim 16, further comprising means for setting a power level of the second modulated signal based on the second command.

* * * * *